(12) United States Patent
Zhao et al.

(10) Patent No.: US 11,226,778 B2
(45) Date of Patent: Jan. 18, 2022

(54) METHOD, APPARATUS AND COMPUTER PROGRAM PRODUCT FOR MANAGING METADATA MIGRATION

(71) Applicant: EMC IP Holding Company LLC, Hopkinton, MA (US)

(72) Inventors: Zhenhua Zhao, Beijing (CN); Sihang Xia, Beijing (CN); Changyu Feng, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/821,404

(22) Filed: Mar. 17, 2020

(65) Prior Publication Data
US 2020/0349081 A1 Nov. 5, 2020

(30) Foreign Application Priority Data
Apr. 30, 2019 (CN) .......................... 201910361667.7

(51) Int. Cl.
*G06F 3/06* (2006.01)
(52) U.S. Cl.
CPC ............ *G06F 3/0685* (2013.01); *G06F 3/061* (2013.01); *G06F 3/0647* (2013.01)
(58) Field of Classification Search
CPC ............................ G06F 3/0647; G06F 3/0685
See application file for complete search history.

(56) References Cited

U.S. PATENT DOCUMENTS

| | | |
|---|---|---|
| 8,935,446 B1 | 1/2015 | Shilane et al. |
| 9,189,402 B1 | 11/2015 | Smaldone et al. |
| 9,189,414 B1 | 11/2015 | Shim et al. |
| 9,235,535 B1 | 1/2016 | Shim et al. |
| 9,304,914 B1 | 4/2016 | Douglis et al. |
| 9,336,143 B1 | 5/2016 | Wallace et al. |
| 9,390,116 B1 | 7/2016 | Li et al. |
| 10,152,381 B1 | 12/2018 | Shvaiger et al. |
| 10,176,183 B1 | 1/2019 | Shim et al. |
| 10,496,290 B1 | 12/2019 | Visvanathan et al. |
| 10,565,120 B1 | 2/2020 | Visvanathan et al. |
| 10,705,753 B2 | 7/2020 | Kucherov et al. |
| 10,733,105 B1 | 8/2020 | Visvanathan et al. |
| 10,860,239 B2 | 12/2020 | Kucherov et al. |
| 10,908,818 B1 | 2/2021 | Visvanathan et al. |
| 10,936,412 B1 | 3/2021 | Visvanathan et al. |

(Continued)

*Primary Examiner* — Chie Yew
(74) *Attorney, Agent, or Firm* — BainwoodHuang

(57) ABSTRACT

Techniques manage metadata. Such techniques involve: in response to receiving a request for accessing metadata in a first page, determining, from a plurality of storage units including pages for storing metadata, a storage unit where the first page is located, the plurality of storage units including a first storage unit and a second storage unit, an access speed of the second storage unit exceeding an access speed of the first storage unit; accessing, from the determined storage unit, the first page for metadata; in response to the first page being accessed from the first storage unit, determining whether hotness of the first page exceeds a threshold level; and in response to the hotness of the first page exceeding the threshold level, transferring the first page from the first storage unit to the second storage unit. Accordingly, such techniques can improve the efficiency for accessing the metadata.

19 Claims, 8 Drawing Sheets

(56) References Cited

U.S. PATENT DOCUMENTS

| | | | |
|---|---|---|---|
| 2002/0103975 A1* | 8/2002 | Dawkins | G06F 12/122 |
| | | | 711/133 |
| 2011/0264855 A1* | 10/2011 | Kasako | G06F 3/0607 |
| | | | 711/114 |
| 2015/0268875 A1* | 9/2015 | Jeddeloh | G06F 3/061 |
| | | | 711/103 |
| 2018/0129424 A1* | 5/2018 | Confalonieri | G11C 13/004 |
| 2018/0314422 A1* | 11/2018 | Gong | G06F 3/0685 |

* cited by examiner

METHOD, APPARATUS AND COMPUTER PROGRAM PRODUCT FOR MANAGING METADATA MIGRATION

CROSS REFERENCE TO RELATED APPLICATION

This application claims priority to Chinese Patent Application No. CN201910361667.7, on file at the China National Intellectual Property Administration (CNIPA), having a filing date of Apr. 30, 2019, and having "METHOD, APPARATUS AND COMPUTER PROGRAM PRODUCT FOR MANAGING DATA" as a title, the contents and teachings of which are herein incorporated by reference in their entirety.

FIELD

Embodiments of the present disclosure generally relate to the field of data storage, and more specifically, to a method, an apparatus and a computer program product for managing metadata.

BACKGROUND

In a modern storage system, a plurality of slices are typically allocated from different storage disks to be combined into a disk array (for example, a redundant array of independent disks (RAID)). When providing a storage service to an upper-level application, it is typically to create a plurality of logical storage units on the disk array, for use by the upper-level application. Generally, some logical storage units are used to store user data, while some other logical storage units are used to store metadata related to the user data, where the metadata is used for recording addresses of the user data, attributes of the user data (for example, whether it is compressed or not, and the like), and other information related to the user data. Accordingly, prior to an actual access to the user data, it is often required to first access the metadata associated with the user data. Considering importance and high access frequency of the metadata, it is desirable to provide a solution for managing metadata, so to improve the efficiency for accessing the metadata when saving the storage space.

SUMMARY

Embodiments of the present disclosure provide a method, an apparatus and a computer program product for managing metadata.

In a first aspect of the present disclosure, there is provided a method of managing metadata. The method includes: in response to receiving a request for accessing metadata in a first page, determining, from a plurality of storage units including pages for storing metadata, a storage unit where the first page is located, the plurality of storage units including a first storage unit and a second storage unit, an access speed of the second storage unit exceeding an access speed of the first storage unit; accessing, from the determined storage unit, the first page for metadata; in response to the first page being accessed from the first storage unit, determining whether hotness of the first page exceeds a threshold level; and in response to the hotness of the first page exceeding the threshold level, transferring the first page from the first storage unit to the second storage unit.

In a second aspect of the present disclosure, there is provided an apparatus for managing metadata. The apparatus includes at least one processing unit and at least one memory. The at least one memory is coupled to the at least one processing unit and stores instructions for execution by the at least one processing unit. The instructions, when executed by the at least one processing unit, cause a device to perform acts including: in response to receiving a request for accessing metadata in a first page, determining, from a plurality of storage units including pages for storing metadata, a storage unit where the first page is located, the plurality of storage units including a first storage unit and a second storage unit, an access speed of the second storage unit exceeding an access speed of the first storage unit; accessing, from the determined storage unit, the first page for metadata; in response to accessing the first page from the first storage unit, determining whether hotness of the first page exceeds a threshold level; and in response to the hotness of the first page exceeding the threshold level, transferring the first page from the first storage unit to the second storage unit.

In a third aspect of the present disclosure, there is provided a computer program product. The computer program product is tangibly stored on a non-transient computer storage medium and includes machine-executable instructions. The machine-executable instructions, when executed by a device, cause the device to execute any step of the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features and advantages of the present disclosure will become more apparent, through the following detailed description on the example embodiments of the present disclosure with reference to the accompanying drawings in which the same reference symbols refer to the same components.

DETAILED DESCRIPTION

Figure 1:
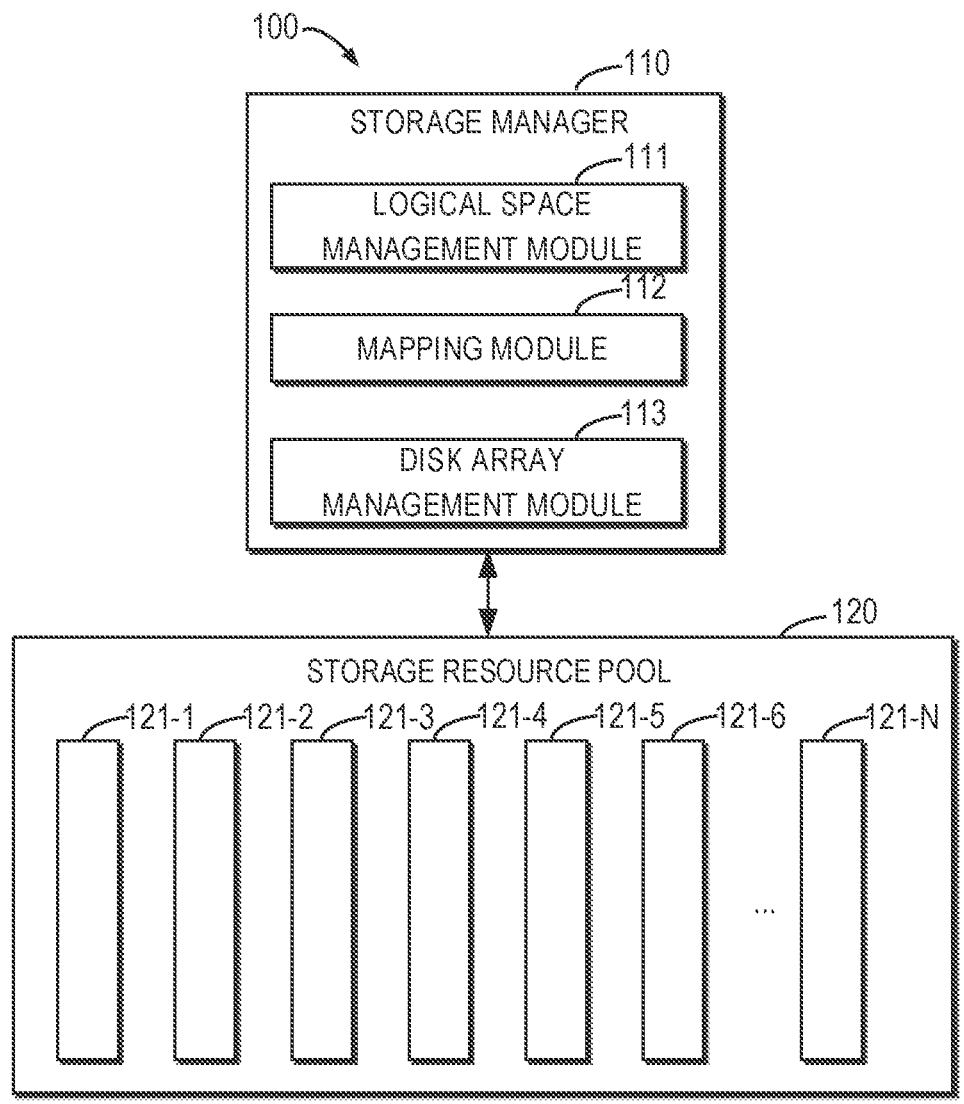
FIG. 1 is a block diagram illustrating an example storage system in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will now be described in more detail with reference to the drawings. Although the preferred embodiments of the present disclosure are illustrated in the drawings, it would be appreciated that the present disclosure may be implemented in various manners but cannot be limited by the embodiments as described herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "based on" is to be read as "based at least in part on." The term "one example embodiment" and "an embodiment" are to be read as "at least one example embodiment." The term "another embodiment" is to be read as "at least one other embodiment." The terms "first," "second," and the like may refer to different or same objects. Other definitions, explicit and implicit, may be included below.

As mentioned above, in a modern storage system, a plurality of slices are typically allocated from different storage disks to be combined into a disk array (for example, a redundant array of independent disks (RAID)). When providing a storage service to an upper-level application, it is typically to create a plurality of logical storage units on the disk array, for use by the upper-level application. Generally, some logical storage units are used to store user data, while some other logical storage units are used to store metadata related to the user data, where the metadata is used for recording addresses of the user data, attributes of the user data (for example, whether it is compressed or not, and the like), and other information related to the user data. Accordingly, prior to an actual access to the user data, it is often required to first access the metadata associated with the user data. Considering importance and high access frequency of the metadata, it is desirable to provide a solution for managing metadata, so to improve the efficiency for accessing the metadata when saving the storage space.

Embodiments of the present disclosure provide a solution for managing metadata. In the solution, in response to receiving a request for accessing metadata in a first page, a storage unit where the first page is located is determined from a plurality of storage units including pages for storing metadata, where the plurality of storage units include a first storage unit and a second storage unit, and an access speed of the second storage unit exceeds that of the first storage speed. The first page is accessed, from the determined storage unit, for metadata. In response to the first page being accessed from the first storage unit, whether hotness of the first page exceeds a threshold level is determined. When the hotness of the first page exceeds the threshold level, the first page is transferred from the first storage unit to the second storage unit and thus can be accessed from the second storage unit with a higher access speed in a next access.

In the way, by storing the metadata with higher access hotness in a storage medium with a higher access speed, embodiments of the present disclosure can achieve higher access efficiency. In addition, embodiments of the present disclosure can make full use of performances of different storage media, thereby achieving a load balance between different storage media.

The embodiments of the present disclosure will be further described in detail with reference to the drawings. FIG. 1 is a block diagram illustrating an example storage system 100 in which the embodiments of the present disclosure can be implemented. It would be appreciated that the structure of the storage system 100 is described merely as an example, without suggesting any limitation to the scope of the present disclosure. For example, the embodiments of the present disclosure are also applicable to a different system or environment from the storage system 100.

As shown in FIG. 1, the system 100 includes a storage manager 110 and a storage resource pool 120. The storage resource pool 120 may include a plurality of disks 121-1, 121-2 . . . 121-N (which are collectively or individually referred to as "disk(s) 121", where N≥1). The "disk" herein may refer to any non-volatile storage medium currently known or to be developed in the future, such as a magnetic disk, an optical disk, a solid-state disk, or the like. The plurality of disks 121 may be based on different storage media.

The storage manager 110 may be configured to manage the storage resource pool 120. As shown in FIG. 1, the storage manager 110, for example, may include a logical space management module 111, a mapping module 112 and a disk array management module 113. It would be appreciated that the structure of the storage manager 110 is shown in FIG. 1 merely as an example, without suggesting any limitation to the scope of the present disclosure. In some embodiments, the storage manager 110 may be implemented in a different structure, for example, including modules not shown in FIG. 1 or omit some modules as shown therein.

The disk array management module 113 may divide each disk 121 in the storage resource pool 120 into a plurality of slices each having a fixed size (for example, each slice may be 4 GB). The disk array management module 113 may organize a plurality of slices on different disks into a disk array. The disk array management module 113 may maintain mapping information between the disk array and the slices.

The mapping module 112 may be configured to implement mapping from a physical address to a logical address space. For example, the mapping module 112 may map a plurality of disk arrays built based on the plurality of disks 121 to a logical address space (for example, to a plurality of logical storage units), for providing the plurality of logical storage units to the logical space management module 111. In some embodiments, the plurality of logical storage units mapped from the plurality of disk arrays may be further divided into different collections of storage units, for storing different types of data (for example, user data and metadata). Hereinafter, the collection of storage units for storing user data is also referred to as "user data storage unit collection" and the collection of storage units for storing metadata is also referred to as "metadata storage unit collection".

The logical space management module 111 may use the logical address space provided by the mapping module 112 to provide a service to the upper-level application. For example, the logical space management module 111 may implement file system interfaces and/or a block transfer protocol over the logical address space.

Figure 2:
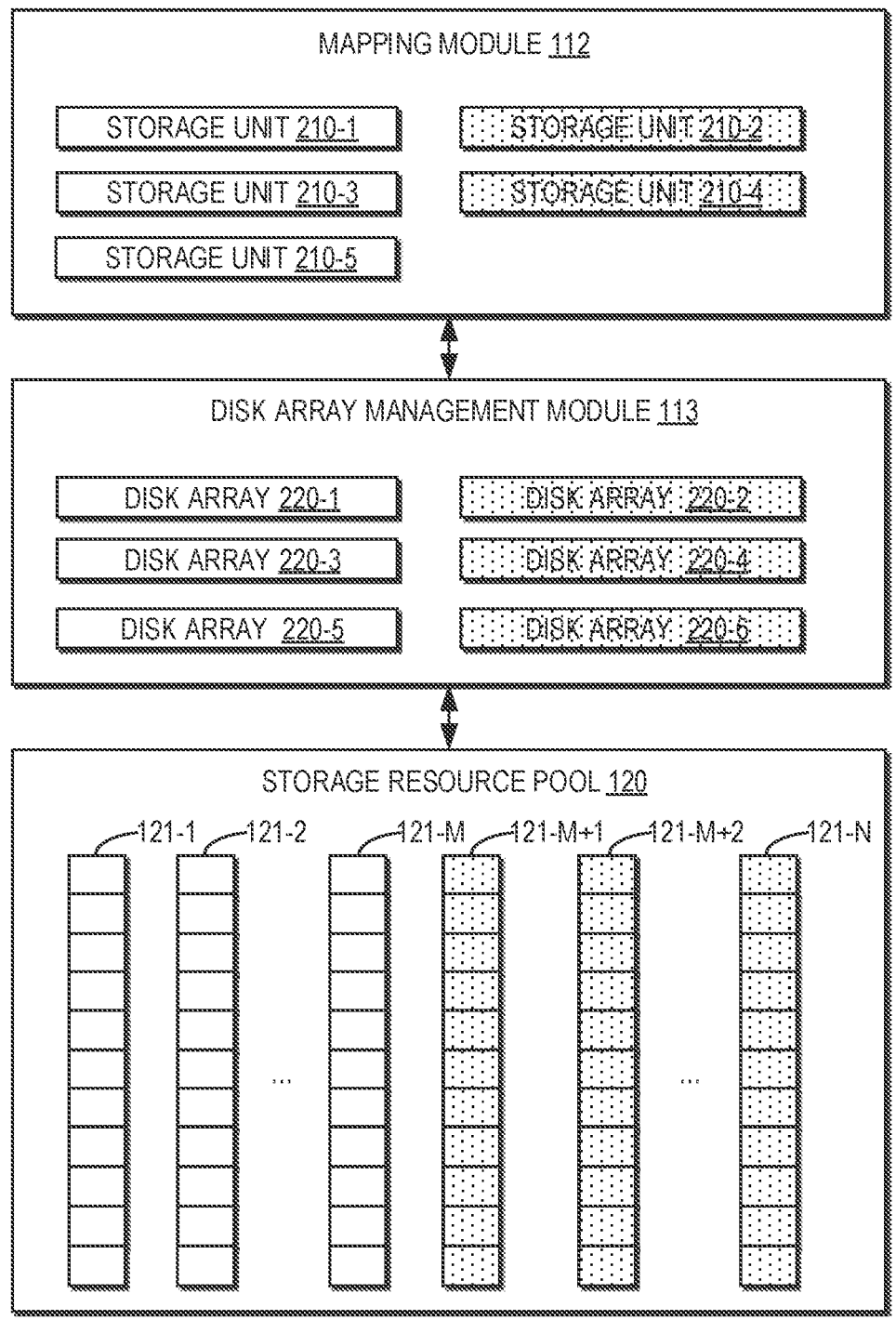
FIG. 2 is a schematic diagram illustrating a layout of a storage space according to embodiments of the present disclosure.

FIG. 2 is a schematic diagram illustrating a layout of a storage space according to embodiments of the present disclosure. For the purpose of illustration, FIG. 2 shows a plurality of disks 121 built based on two different types of storage media. As shown in FIG. 2, the disks 121-1, 121-2 . . . 121-M (where M<N) are built based on the first storage medium, and the disks 121-M+1, 121-M+2 . . . 121-N are built based on the second storage medium, where the access speed of the second storage medium exceeds that of the first storage medium. It would be appreciated that the first storage medium or the second storage medium may be any non-volatile storage medium currently known or to be developed in the future, including, but not limited to, a magnetic disk, an optical disk, a solid state disk (for example, a solid state disk with a serial SCSI interface, or a solid state disk with an NVMe interface), and the like.

As shown in FIG. 2, the disk array management module 113 organizes the plurality of disks 121-1, 121-2 . . . 121-N into a plurality of disk arrays 220-1, 220-2 . . . 220-6 (which are collectively referred to as "disk arrays 220"). For example, the disk arrays 220-1, 220-3 and 220-5 are built based on the disks 121-1, 121-2 . . . 121-M (i.e., the first storage medium), and the disk arrays 220-2, 220-4 and 220-6 are built based on the disks 121-M+1, 121-M+2 . . . 121-N (i.e., the second storage medium). Further, the mapping module 112 may map the physical storage space provided by the disk array management module 113 to a plurality of logical storage units 210-1, 210-2 . . . 210-N (which are collectively referred to as "storage units 210"). For example, the disk arrays 220-1, 220-3 and 220-5 built based on the first storage medium are mapped to the storage units 210-1, 210-3 and 210-5; and the disk arrays 220-1, 220-3 and 220-5 built based on the second storage medium are mapped to the storage units 210-2 and 210-4. It would be appreciated that FIG. 2 shows the respective numbers of disk arrays and storage units merely for the purpose of illustration, without suggesting any limitation to the scope of the present disclosure. Embodiments of the present disclosure are also applicable to different numbers of disk arrays and storage units.

As described above, in some embodiments, the plurality of logical storage units may be divided into a plurality of storage unit sets for storing different types of data. For example, the plurality of logical storage units may be divided into a collection of metadata storage units and a collection of user data storage units for storing metadata and user data respectively. In the context, a storage unit for storing metadata is also referred to as "metadata storage unit", and a unit for storing user data is also referred to as "user data storage unit".

Figure 3:
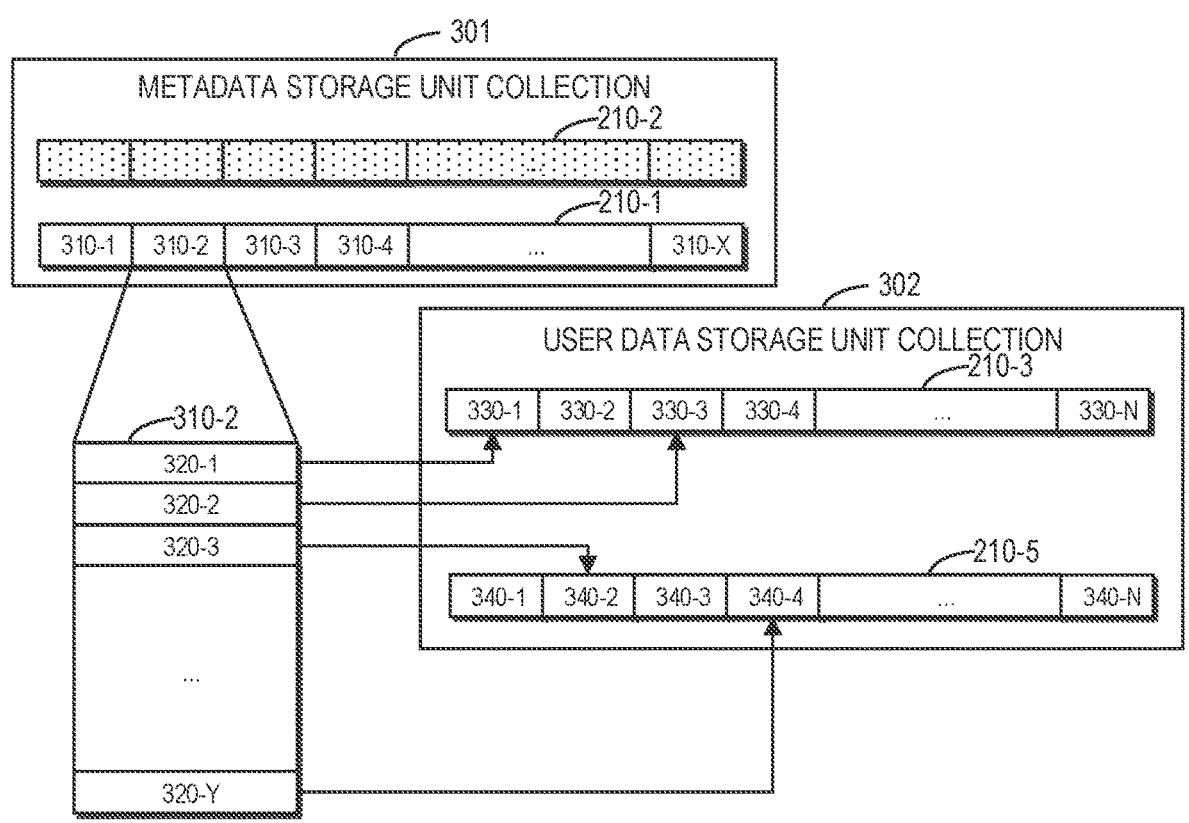
FIG. 3 is a schematic diagram illustrating the relationship between metadata storage units and user data storage units according to embodiments of the present disclosure.

FIG. 3 is a schematic diagram illustrating a relationship between metadata storage units and user data storage units according to embodiments of the present disclosure. FIG. 3 shows a metadata storage unit collection 301 and a user data storage unit collection 302. For example, the metadata storage unit collection 301 may include metadata storage units 210-1 and 210-2, while the user data storage unit collection 302 may include user data storage units 210-3 and 210-5.

In some embodiments, each user data storage unit may be divided into a plurality of storage blocks each having a fixed size (for example, 2 MB). As shown in FIG. 3, taking the user storage unit 210-3 as an example, the user data storage unit 210-3 may include, for example, N storage blocks 330-1, 330-2 . . . 330-N (where N≥1). Taking the user data storage unit 210-5 as an example, the user data storage unit 210-5 may include, for example, N storage blocks 340-1, 340-2 . . . 340-N (where N≥1). Each storage block may have a corresponding storage block descriptor (for example, 112 bytes) for recording metadata of the storage block, such as the physical address corresponding to the storage block, a utilization rate of the storage block, and the like. The storage block descriptor may be stored in the metadata storage unit.

In some embodiments, each metadata storage unit may be divided into pages each having a fixed size (for example, 4 KB). As shown in FIG. 3, taking the metadata storage unit 210-1 as an example, the metadata storage unit 210-1 may include, for example, X pages 310-1, 310-2 . . . 310-X (where X≥1). Taking the page 310-2 as an example, the page 310-2 may include, for example, Y storage block descriptors 320-1, 320-2 . . . 320-Y (where Y≥1). For example, the storage block descriptor 320-1 is used for recording metadata of the storage block 330-1, the storage block descriptor 320-2 is used for recording metadata of the storage block 330-3, the storage block descriptor 320-3 is used for recording metadata of the storage block 340-2 . . . the storage block descriptor 320-4 is used for recording metadata of the storage block 340-4, and the like.

In some embodiments, the metadata storage unit collection 301 may include metadata storage units having different access speeds. For example, in FIG. 3, the metadata storage unit collection 301 includes storage units 210-1 and 210-2, where the storage unit 210-2 is built based on the second storage medium having a higher access speed, while the storage unit 210-1 is built based on the first storage medium having a lower access speed. In some embodiments, in order to improve the metadata access efficiency, the metadata with higher access hotness is stored in the metadata storage unit with a higher access speed, while the metadata with lower access hotness is stored in the metadata storage unit with a lower access speed, thereby improving the metadata access efficiency.

FIGS. 4A-4E are schematic diagrams of transferring a metadata page among a plurality of storage units with different access speeds according to embodiments of the present disclosure.

Figure 4A:
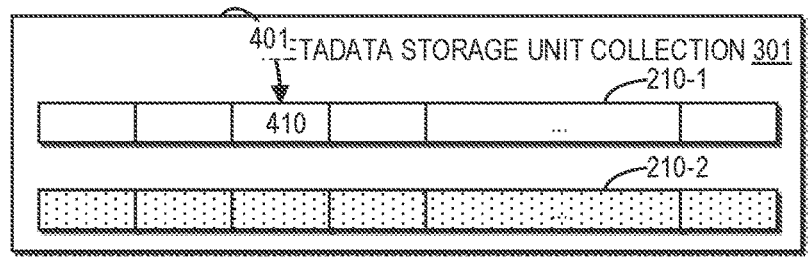
FIGS. 4A-4E are schematic diagrams of transferring a metadata page among a plurality of storage units with different access speeds according to embodiments of the present disclosure.

As shown in FIG. 4A, for example, initially, a metadata page 410 is located in the storage unit 210-1 with a lower access speed. In response to receiving 401 a request for accessing metadata (for example, a storage block descriptor) in the metadata page 410, the metadata in the metadata page 410 may be accessed from the storage unit 210-1 with a lower access speed.

Figure 4B:
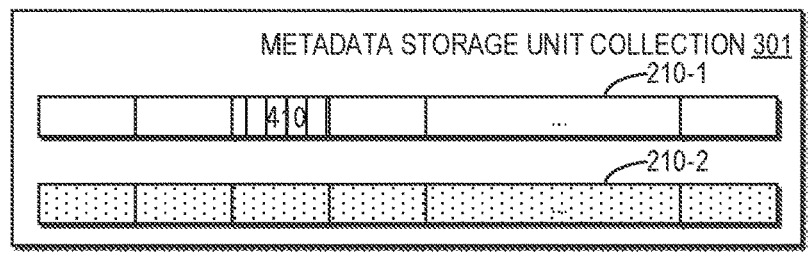

In response to the metadata page 410 being accessed from the storage unit 210-1 with a lower access speed, it may be further determined whether the hotness of the page 410 exceeds a threshold level. In some embodiments, as will be described further with reference to FIG. 5, the number of times the page 410 is accessed from the storage unit 210-1 at a time interval below a threshold time interval (for example, a predetermined time window W) may be used as a measure of the hotness of the page 410. If the determined number of times exceeds a threshold number (which is also referred to as "first threshold number" herein), as shown in FIG. 4B, the page 410 may be identified as a page to be transferred. It would be appreciated that, in other embodiments, for example, the access frequency of the page 410, the number of times the page 410 is accessed in a predetermined time interval, or the like, may be used as a measure of the hotness of the page 410. Embodiments of the present disclosure are not limited in the aspect.

Figure 4C:
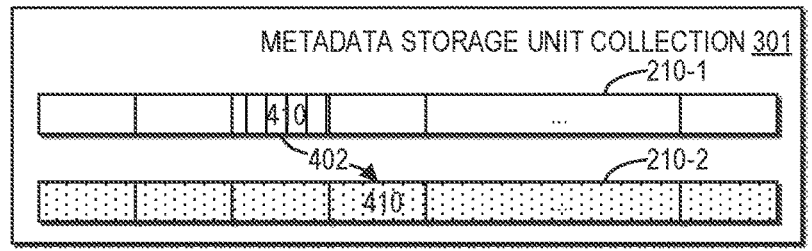

As shown in FIG. 4C, when the page 410 in the storage unit 210-1 is identified as a page to be transferred, the page 410 can be transferred from the storage unit 210 with a lower access speed to the storage unit 210-2 with a higher access speed. For example, in the storage unit 210-2, an idle page may be allocated for storing metadata of the page 410 from the storage unit 210-1. In response to the idle page being allocated, the metadata in the page 410 in the storage unit 210-1 may be copied to the allocated idle page.

Figure 4D:
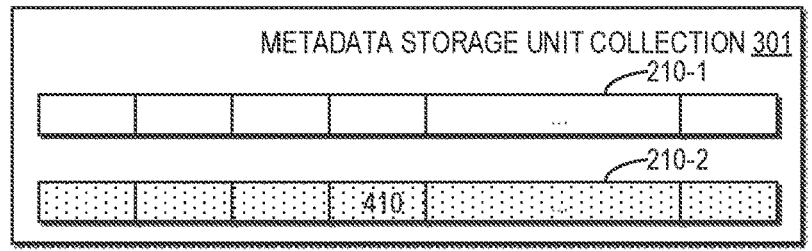

As shown in FIG. 4D, when the page 410 is transferred 402 from the storage unit 210-1 with a lower access speed to the storage unit 210-2 with a higher access speed, the corresponding storage space in the storage unit 210-1 may be released.

Figure 4E:
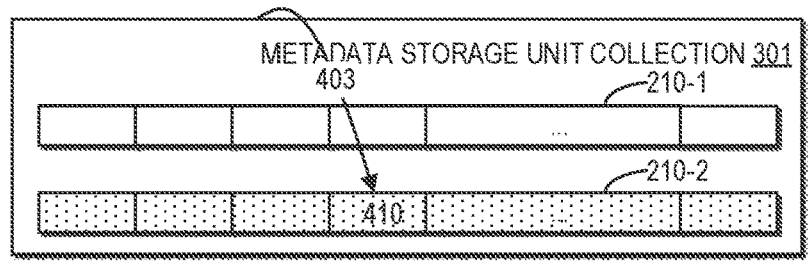

As shown in FIG. 4E, when the request for accessing the metadata in the data page 410 is received 403 once again, the metadata in the metadata page 410 may be accessed from the storage unit 210-2 with a higher access speed.

Although the description with reference to FIGS. 2-4E includes only two example storage units 2210-1 and 210-2 with two different access speeds, it would be appreciated that this is provided merely for illustration, without suggesting any limitation to the scope of the present disclosure. Embodiments of the present disclosure are also applicable to more storage units with more different access speeds.

Figure 5:
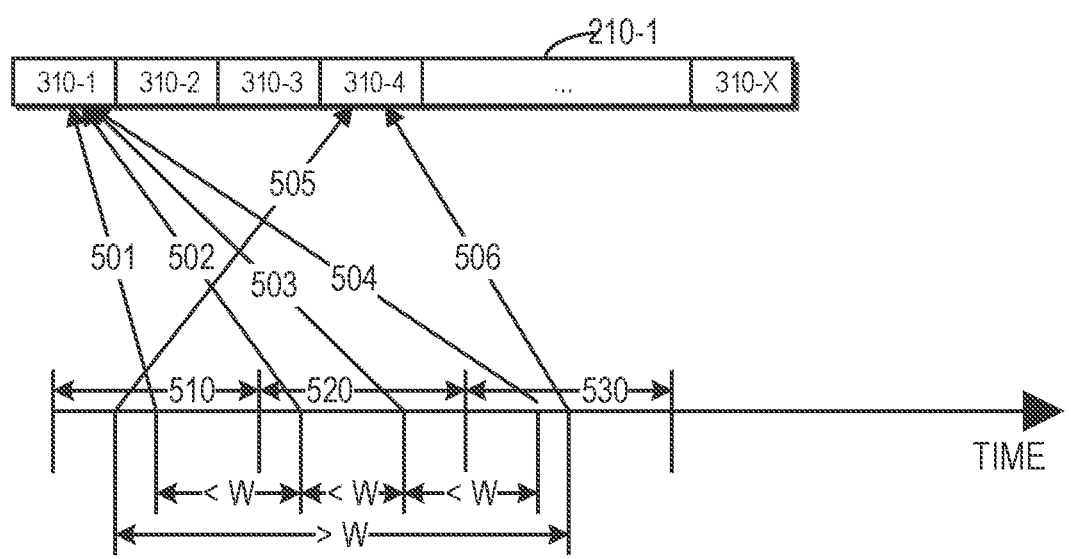
FIG. 5 is a schematic diagram of determining hotness of a metadata page according to embodiments of the present disclosure.

FIG. 5 illustrates a schematic diagram of determining hotness of a metadata page according to embodiments of the present disclosure. FIG. 5 illustrates the metadata storage unit 210-1 as shown in FIG. 2, which, for example, includes the plurality of pages 310-1, 310-2 . . . 310-X (where X≥1). In some embodiments, for each page, the mapping module 112 may record access information of the page, which at least includes last access time of the page, an access count (for example, the number of times the page is accessed in a time interval below a threshold time interval), and the like. The mapping module 112 may determine the hotness of the page based on the access information.

As shown in FIG. 5, for example, widths of three time windows 510, 520 and 530 each are W. During the time window 510, an access 505 to the page 310-4 and an access 501 to the page 310-1 occur. Therefore, at the end of the time window 510, the last access time of the page 310-4 is updated as the time of occurrence of the access 505, and the access count of the page 310-4 is updated as 1. The last access time of the page 310-1 is updated as the time of occurrence of the access 501, and the access count of the page 310-1 is updated as 1.

During a next window 520 following the time window 510, two accesses 502 and 503 to the page 310-1 occur. Since a time interval between the access 502 and the previous access 501 to the same page 310-1 is below W, after the access 502, the last access time of the page 310-1 is updated as the time of occurrence of the access 502, and the access count of the page 310-1 is updated as 2. Likewise, after the access 503, the last access time of the page 310-1 is updated as the time of occurrence of the access 503, and the access count of the page 310-1 is updated as 3.

During a next time window 530 following the time window 520, an access 504 to the page 310-1 and an access 506 to the page 310-4 occur. After the access 504, the last access time of the page 310-1 is updated as the time of occurrence of the access 504, and the access count of the page 310-1 is updated as 4. Since a time interval between the access 506 and the previous access 505 to the same page 310-4 exceeds W, after the access 506, the last access time of the page 310-4 is updated as the time of occurrence of the access 506, and the access count of the page 310-4 returns to zero. That is, at the end of the time window 530, the access count of the page 310-1 is 4, while the access count of the page 310-4 is zero.

In some embodiments, the mapping module 112 may determine, based on the access count of each page, hotness of the page. For example, when the access count of a certain page exceeds the first threshold number, the page may be identified as a page to be transferred. In some embodiments, the setting of the first threshold number requires a comprehensive consideration a balance between the number of pages that can be accommodated in the storage unit with a higher access speed and the performance of the storage system. For example, if there are too many pages transferred into the storage unit with a higher access speed, metadata in these pages can be accessed with relatively high efficiency, while the efficiency for accessing the user data may become a bottleneck of the system, causing a failure in improving the overall performance of the storage system. In the case, even though more pages are transferred to the storage unit with a higher access speed, the overall performance of the storage system cannot be improved significantly.

Figure 6:
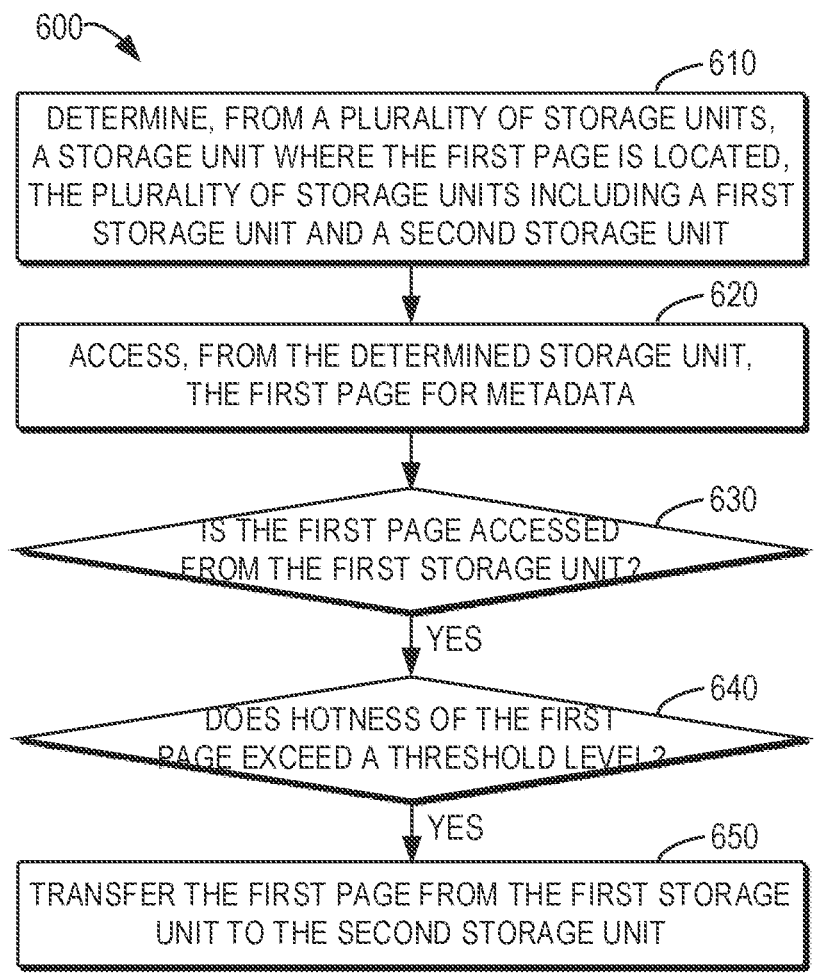
FIG. 6 is a flowchart of an example method of managing metadata according to embodiments of the present disclosure.

FIG. 6 is a flowchart of an example method 600 of managing metadata according to embodiments of the present disclosure. The method 600, for example, may be executed by the storage manager 100 (for example, the mapping module 112) as shown in FIG. 1. As would be appreciated, the method 600 may further include additional acts not shown and/or may omit the shown acts, and the scope of the present disclosure is not limited in the aspect.

At block 610, in response to receiving a request for accessing metadata in a first page (for example, the page 410 as shown in FIG. 4), the storage manager 110 determines, from a plurality of storage units including pages for storing metadata (for example, the set of storage units 301 as shown in FIG. 4), a storage unit where the first page is located. In some embodiments, the plurality of storage units include a first storage unit (for example, the storage unit 210-1 as shown in FIG. 4) and a second storage unit (for example, the storage unit 210-1 as shown in FIG. 4), and the access speed of the second storage unit exceeds the access speed of the first storage unit.

In some embodiments, respective index information of all pages transferred to the second storage unit may be recorded in an index structure (which is referred to as "first index structure" herein). For example, the first index structure may be implemented as a Least Recently Used (LRU) queue. In some embodiments, the storage manager 110 may determine, from the request, first index information of the first page, and search the first index structure for the first index information. If the first index information is recorded in the first index structure, the storage manager 110 may determine that the first page is located in the second storage unit. Otherwise, the storage manager 110 may determine that the first page is located in the first storage unit.

At block 620, the storage manager 110 accesses, from the determined storage unit, the first page for metadata.

In some embodiments, in response to determining that the first page is located in the second storage unit, the storage manager 110 may access, from the second storage unit, the first page for metadata.

In some embodiments, in response to determining that the first page is in the first storage unit, the storage manager 110 may access, from the first storage unit, the first page for metadata.

At block 630, the storage manager 110 determines whether the first page is accessed from the first storage unit with a lower access speed. In response to the first storage unit being accessed from the first page, at block 640, the storage manager 110 determines whether hotness of the first page exceeds a threshold level.

In some embodiments, the storage manager 110 may determine the number of times the first page is accessed from the first storage unit at a time interval less than a threshold time interval (as described above with reference to FIG. 5). If the the number of times exceeds the first threshold number, the storage manager 110 may determine that the hotness of the first page exceeds the threshold level.

In response to the hotness of the first page exceeding the threshold level, at block 650, the storage manager 110 transfers the first page from the first storage unit to the second storage unit with a higher access speed.

In some embodiments, respective index information of all pages to be transferred from the first storage unit to the second storage unit with a higher access speed may be recorded in an index structure (which is also referred to as "second index structure" herein). For example, the second index structure may be implemented as an LRU queue. The storage manager 110 may determine whether the first index information of the first page has been recorded in the second index structure. If it is determined that the first index information of the first page is not recorded in the second index structure, the storage manager 110 may record the first index information in the second index structure, such that the first page can be transferred from the first storage unit to the second storage unit.

In some embodiments, the storage manager 110 may initiate a backend service for transferring pages to be transferred, as indicated in the second index structure, from the first storage unit to the second storage unit. For example, in response to determining that the second index structure includes index information of at least one page to be transferred, the backend service may transfer the at least page from the first storage unit to the second storage unit. The backend service may further transfer the index information of the at least one page from the second index structure to the first index structure. The transfer process will be described in detail further with reference to FIGS. 7A-7C.

Alternatively, or in addition, in some embodiments, when the number of pages in the second storage unit with a higher access speed exceeds a threshold number (which is also referred to as "second threshold number"), the storage manager 110 may select, from the pages included in the second storage unit, a least recently accessed page (which is also referred to as "second page" herein), and transfer the selected second page from the second storage unit to the first storage unit. Correspondingly, the storage manager 110 may remove the index information of the second page from the first index structure.

Figure 7A:
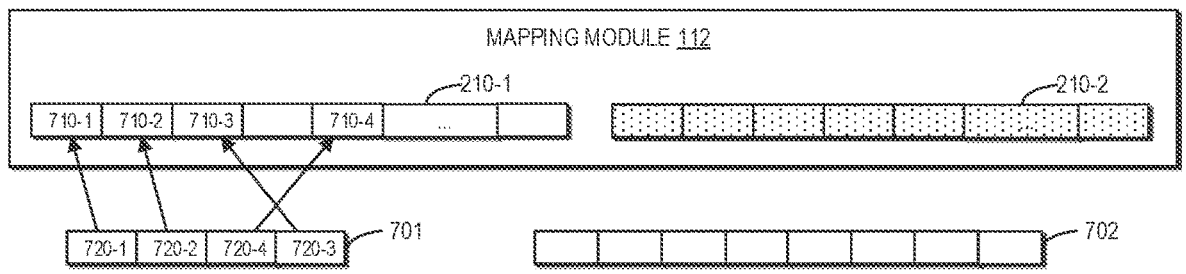
FIGS. 7A-7C are schematic diagrams of transferring a metadata page according to embodiments of the present disclosure.
Figure 7B:
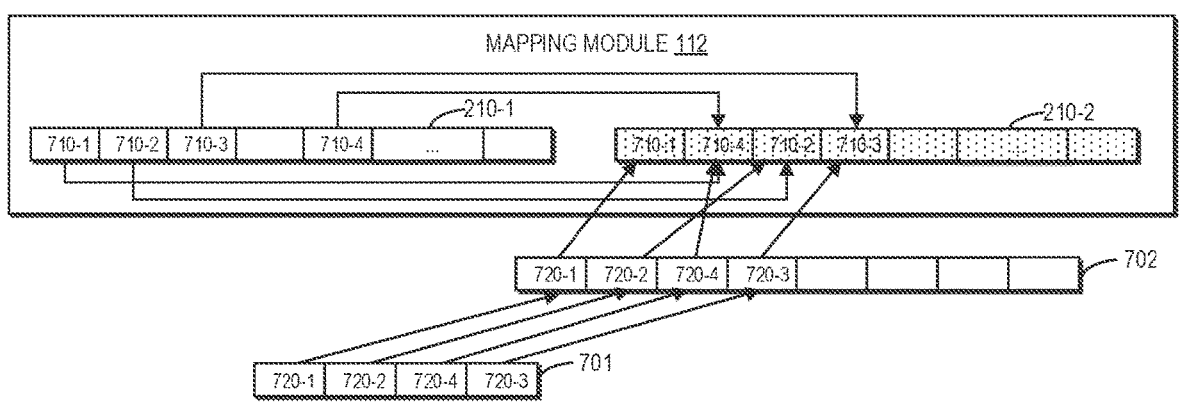
Figure 7C:
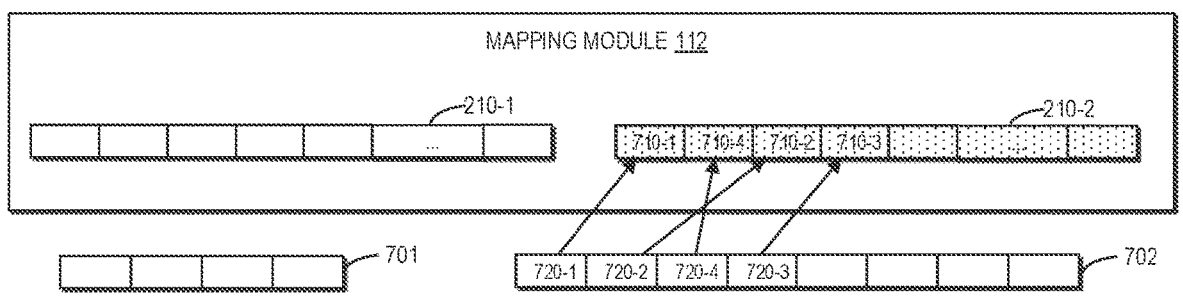

FIGS. 7A-7C are schematic diagrams of transferring a metadata page according to embodiments of the present disclosure. As shown in FIG. 7A, for example, four pages 710-1, 710-2 . . . 710-4 in the first storage unit 210-1 are identified as pages to be transferred. Respective mapping information 720-1, 720-2 . . . 720-4 thereof is recorded in the index structure 701 (i.e., the second index structure). It is assumed that, initially, the second storage unit 210-2 does not include any metadata page. Therefore, the index structure 702 (i.e., the first index structure) for recording respective index information of pages in the second storage unit 210-2 is empty.

As shown in FIG. 7B, for example, the mapping module 112 transfers the four pages 710-1, 710-2 . . . 710-4 from the first storage unit 210-1 to the second storage unit 210-2. In addition, the mapping module 112 also transfers the respective mapping information 720-1, 720-2 . . . 720-4 of the four pages 710-1, 710-2 . . . 710-4 from the index structure 701 to the index structure 702.

As shown in FIG. 7C, when the migration of the pages and index information is completed, the first storage unit 210-1 and the corresponding storage space in the second index structure 701 may be released. At this time, the metadata of the four pages 710-1, 710-2 . . . 710-4 are stored in the second storage unit 210-2, and their respective mapping information 720-1, 720-2 . . . 720-4 is recorded in the index structure 702.

It can be seen from the above descriptions that, by storing the metadata with higher access hotness in a storage medium with a higher access speed, embodiments of the present disclosure can achieve higher access efficiency. In addition, embodiments of the present disclosure can make full use of performances of different storage media, thereby achieving a load balance between different storage media.

Figure 8:
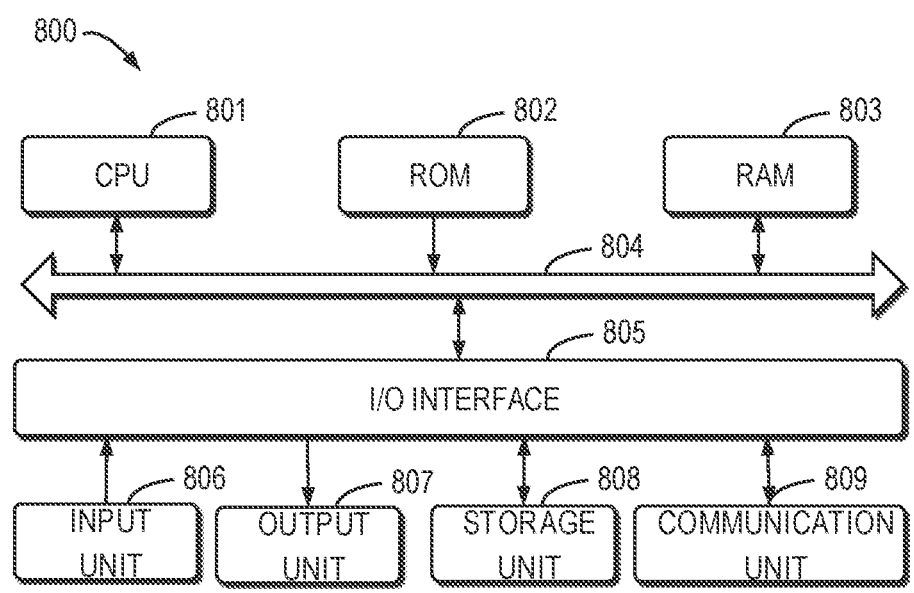
FIG. 8 is a block diagram illustrating an example device that can be used to implement embodiments of the present disclosure.

FIG. 8 is a block diagram illustrating an example device 800 that can be used to implement embodiments of the present disclosure. For example, the storage manager 110 as shown in FIG. 1 may be implemented by the device 800. As shown in FIG. 8, the device 800 includes a central processing unit (CPU) 810 which performs various appropriate acts and processing, based on computer program instructions stored in a read-only memory (ROM) 802 or computer program instructions loaded from a storage unit 808 to a random access memory (RAM) 803. The RAM 803 stores therein various programs and data required for operations of the device 800. The CPU 801, the ROM 802 and the RAM 803 are connected via a bus 804 with one another. An input/output (I/O) interface 805 is also connected to the bus 804.

The following components in the device 800 are connected to the I/O interface 805: an input unit 806 such as a keyboard, a mouse and the like; an output unit 807 including various kinds of displays and a loudspeaker, etc.; a storage unit 808 including a magnetic disk, an optical disk, and etc.; a communication unit 809 including a network card, a modem, and a wireless communication transceiver, etc. The communication unit 809 allows the device 800 to exchange information/data with other devices through a computer network such as the Internet and/or various kinds of telecommunications networks.

Various processes and processing described above, e.g., the method 600, may be executed by the processing unit 801. For example, in some embodiments, the method 600 may be implemented as a computer software program that is tangibly included in a machine readable medium, e.g., the storage unit 808. In some embodiments, part or all of the computer programs may be loaded and/or mounted onto the device 800 via ROM 802 and/or communication unit 809. When the computer program is loaded to the RAM 803 and executed by the CPU 801, one or more steps of the method 600 as described above may be executed.

The present disclosure may be a method, device, system, and/or computer program product. The computer program product may include a computer readable storage medium having computer readable program instructions thereon for carrying out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means (e.g., specialized circuitry) for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing metadata, comprising:
   in response to receiving a request for accessing metadata in a first page, determining, from a plurality of storage units including pages for storing metadata, a storage unit where the first page is located, the plurality of storage units comprising a first storage unit and a second storage unit, an access speed of the second storage unit exceeding an access speed of the first storage unit;
   accessing, from the determined storage unit, the first page for metadata;
   in response to the first page being accessed from the first storage unit, determining that hotness of the first page exceeds a threshold level; and
   in response to the hotness of the first page exceeding the threshold level, transferring the first page from the first storage unit to the second storage unit,
   wherein determining that the hotness of the first page exceeds the threshold level comprises:
      counting, within a time window of duration W, a number of times the first page is accessed from the first storage unit; and
      resetting the counting to zero in response the first page being accessed two consecutive times separated by more than W.

2. The method of claim 1, wherein determining the storage unit where the first page is located comprises:
   acquiring a first index structure for recording index information of pages in the second storage unit;
   determining, from the request, first index information of the first page; and
   in response to determining that the first index information is recorded in the first index structure, determining that the first page is located in the second storage unit.

3. The method of claim 2, further comprising:
   in response to determining that the first index information is absent in the first index structure, determining that the first page is located in the first storage unit.

4. The method of claim 1, wherein accessing the first page from the determined storage unit comprises:
   in response to determining that the first page is located in the second storage unit, accessing the first page from the second storage unit; and
   in response to determining that the first page is located in the first storage unit, accessing the first page from the first storage unit.

5. The method of claim 1, wherein determining that the hotness of the first page exceeds the threshold level further comprises:
   in response to a count produced by the counting exceeding a first threshold number, determining that the hotness of the first page exceeds the threshold level.

6. The method of claim 2, wherein transferring the first page from the first storage unit to the second storage unit comprises:
   acquiring a second index structure for recording index information of pages to be transferred from the first storage unit to the second storage unit;
   determining that the first index information is not recorded in the second index structure; and
   in response to determining that the first index information is absent in the second index structure, recording the first index information in the second index structure.

7. The method of claim 6, further comprising:
   in response to determining that the second index structure includes index information of at least one page to be transferred, transferring the at least one page from the first storage unit to the second storage unit; and
   transferring the index information of the at least one page from the second index structure to the first index structure.

8. The method of claim 1, wherein the second storage unit includes a set of pages, and the method further comprises:
   in response to the number of the set of pages exceeding a second threshold number, determining, from the set of pages, a second page to be transferred from the second storage unit to the first storage unit; and
   transferring the second page from the second storage unit to the first storage unit.

9. The method of claim 8, wherein determining the second page comprises:
   selecting, from the set of pages, a least recently accessed page as the second page.

10. An apparatus for managing metadata, comprising:
    at least one processing unit; and
    at least one memory coupled to the at least one processing unit and storing instructions for execution by the at least one processing unit, the instructions, when executed by the at least one processing unit, causing the apparatus to perform acts comprising:
    in response to receiving a request for accessing metadata in a first page, determining, from a plurality of storage units including pages for storing metadata, a storage unit where the first page is located, the plurality of storage units comprising a first storage unit and a second storage unit, an access speed of the second storage unit exceeding an access speed of the first storage unit;
    accessing, from the determined storage unit, the first page for metadata;
    in response to the first page being accessed from the first storage unit, determining whether hotness of the first page exceeds a threshold level; and
    in response to the hotness of the first page exceeding the threshold level, transferring the first page from the first storage unit to the second storage unit,
    wherein determining whether the hotness of the first page exceeds the threshold level comprises:
       counting, within a time window of duration W, a number of times the first page is accessed from the first storage unit; and
       resetting the counting to zero in response the first page being accessed two consecutive times separated by more than W.

11. The apparatus of claim 10, wherein determining the storage unit where the first page is located comprises:
    acquiring a first index structure for recording index information of pages in the second storage unit;
    determining, from the request, first index information of the first page; and
    in response to determining that the first index information is recorded in the first index structure, determining that the first page is located in the second storage unit.

12. The apparatus of claim 11, wherein the acts further comprise:
in response to determining that the first index information is absent in the first index structure, determining that the first page is located in the first storage unit.

13. The apparatus of claim 10, wherein accessing the first page from the determined storage unit comprises:
in response to determining that the first page is located in the second storage unit, accessing the first page from the second storage unit; and
in response to determining that the first page is located in the first storage unit, accessing the first page from the first storage unit.

14. The apparatus of claim 10, wherein determining whether the hotness of the first page exceeds the threshold level further comprises:
in response to a count produced by the counting exceeding a first threshold number, determining that the hotness of the first page exceeds the threshold level.

15. The apparatus of claim 11, wherein transferring the first page from the first storage unit to the second storage unit comprises:
acquiring a second index structure for recording index information of pages to be transferred from the first storage unit to the second storage unit;
determining whether the first index information is recorded in the second index structure; and
in response to determining that the first index information is absent in the second index structure, recording the first index information in the second index structure.

16. The apparatus of claim 15, wherein the acts further comprise:
in response to determining that the second index structure includes index information of at least one page to be transferred, transferring the at least one page from the first storage unit to the second storage unit; and
transferring the index information of the at least one page from the second index structure to the first index structure.

17. The apparatus of claim 10, wherein the second storage unit includes a set of pages, and the method further comprises:
in response to the number of the set of pages exceeding a second threshold number, determining, from the set of pages, a second page to be transferred from the second storage unit to the first storage unit; and
transferring the second page from the second storage unit to the first storage unit.

18. The apparatus of claim 17, wherein determining the second page comprises:
selecting, from the set of pages, a least recently accessed page as the second page.

19. A computer program product having a non-transitory computer readable medium which stores a set of instructions to manage metadata; the set of instructions, when carried out by computerized circuitry, causing the computerized circuitry to perform a method of:
in response to receiving a request for accessing metadata in a first page, determining, from a plurality of storage units including pages for storing metadata, a storage unit where the first page is located, the plurality of storage units comprising a first storage unit and a second storage unit, an access speed of the second storage unit exceeding an access speed of the first storage unit;
accessing, from the determined storage unit, the first page for metadata;
in response to the first page being accessed from the first storage unit, determining whether hotness of the first page exceeds a threshold level; and
in response to the hotness of the first page exceeding the threshold level, transferring the first page from the first storage unit to the second storage unit,
wherein determining whether the hotness of the first page exceeds the threshold level comprises:
counting, within a time window of duration W, a number of times the first page is accessed from the first storage unit; and
resetting the counting to zero in response the first page being accessed two consecutive times separated by more than W.

\* \* \* \* \*